Jan. 19, 1937.  J. V. MARTIN  2,068,300
AEROPLANE
Filed Nov. 16, 1923  3 Sheets-Sheet 1
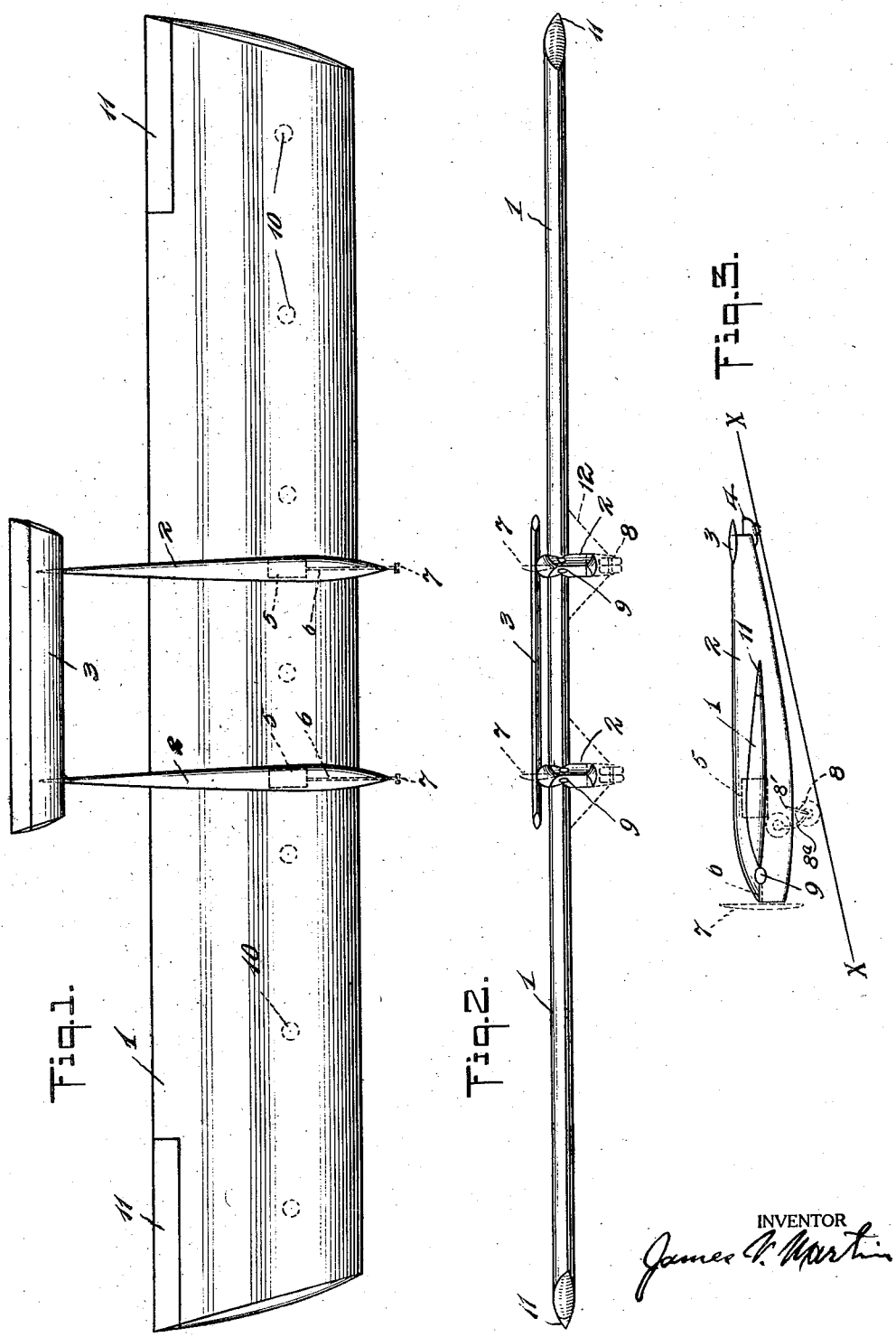
INVENTOR
James V. Martin

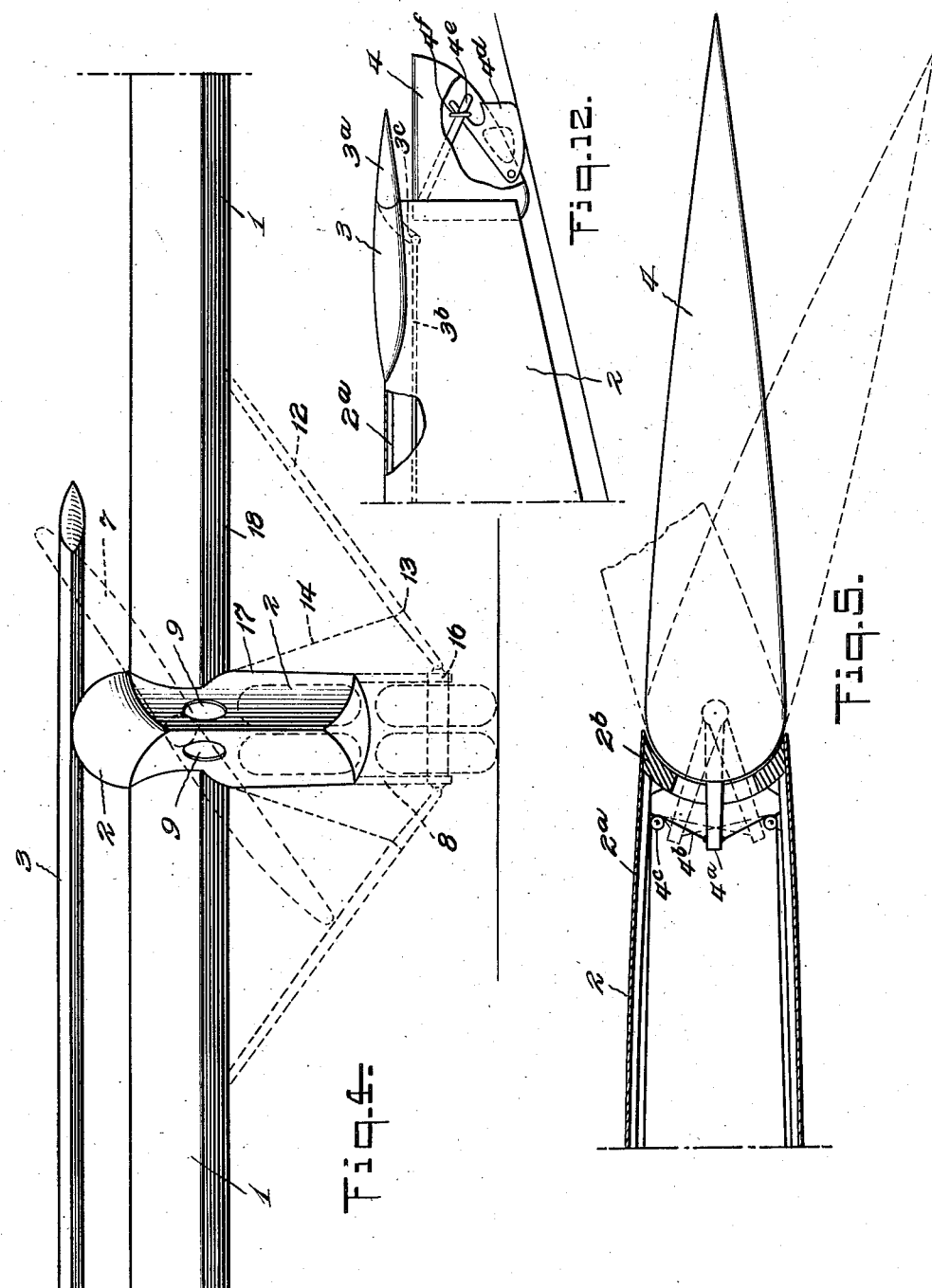

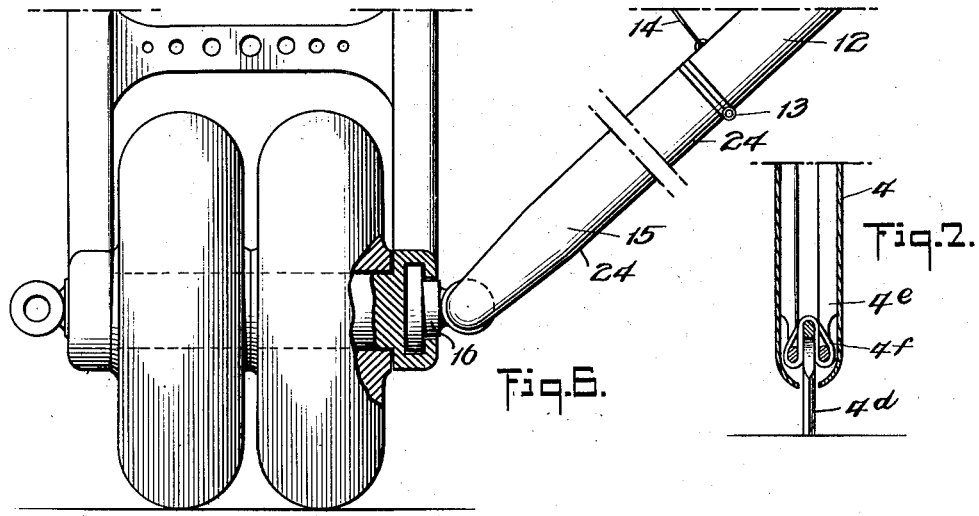
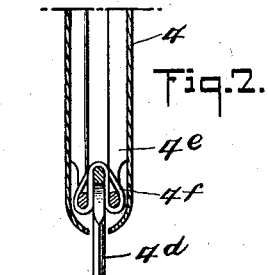
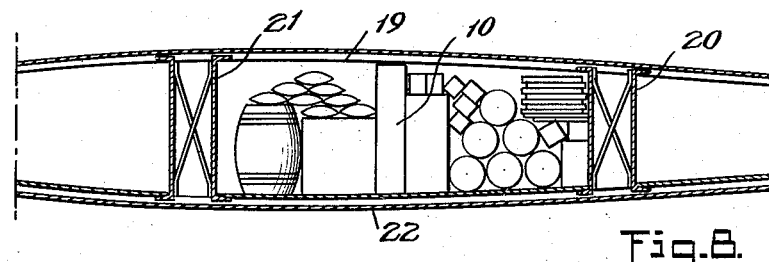
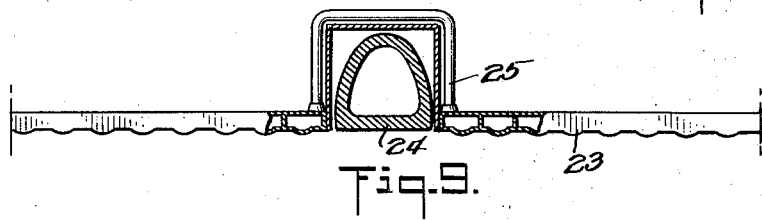
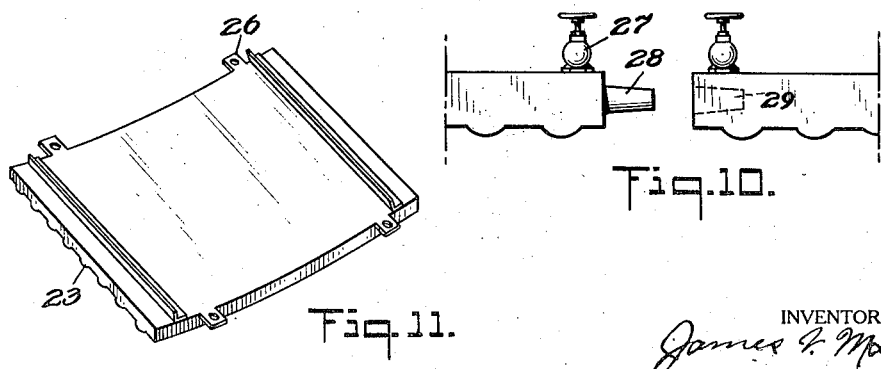
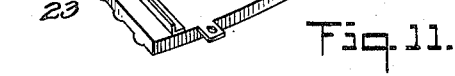

Patented Jan. 19, 1937

2,068,300

UNITED STATES PATENT OFFICE 2,068,300

AEROPLANE

James V. Martin, Garden City, N. Y.

Application November 16, 1923, Serial No. 675,156

8 Claims. (Cl. 244—101)

The subject matter as shown on page one of the drawings is identical with that of my Patent No. 1,771,053 issued July 22, 1930 filed May 3, 1919 and relates to an improved form of aeroplane or seaplane wherein the useful or aerofoil resistance is so disposed as to secure the maximum advantage therefrom and wherein the useless or structural resistance is eliminated.

The primary object of the invention is to greatly improve the lift drag ratio of aeroplanes by eliminating structural resistance and at the same time preserve their aspect ratio and practical maneuverability.

An aerofoil is any shape projected through the atmosphere for an aerodynamic reaction, aerofoils are classified as sustaining, propelling and controlling, structural resistance is the air disturbance created by any non-aerofoil portion of an aeroplane, classified as body, wing truss, chassis and external wires, brackets or leads, and the conventional type radiators.

It is alleged for the present invention that it is the first recorded conception of an aeroplane having no structural or parasite resistance whatever, since there are no external wires, brackets or leads to interfere with the atmosphere surrounding the aerofoils particularly adjacent the wing's lateral center where the wing's best lifting characteristics exist, since the wing truss is entirely internal, since the chassis is retractable together with the wing braces in flight and since both the size, form and location of the body or fuselage has been altered from conventional practice so that all of the external surface of the said fuselages is necessary both in form and amount as directional fin area and the fact that these bodies may be occupied by men, motors and the like is additional to their primary function as control aerofoils.

The accomplishment of the main object involves changes entirely new in aeroplane construction, for example the elimination of the wing braces and chassis by retraction during flight, the complete inclosing of all bracing and controls within the wings, fuselages and control surfaces and, in order to provide a construction wherein the fuselage serves primarily as directional fin area and is so shaped as to lessen drag, it has been necessary to eliminate the conventional type of radiator which occupies the nose of the usual fuselage and this can only be done by arranging the radiator surface to exactly coincide with the external skin of the fins and the wing surface.

The wing of an aeroplane is driven through the atmosphere by the propeller thrust in order that the larger component of the wing's total resistance, that component known as "lift", may counteract the weight of the aeroplane, the smaller component, formerly called drift is now called drag. The purpose of projecting the wing through the air is to obtain the larger component or lift. The aeroplane control surfaces also create aerodynamic reactions, a large component of which is useful for the purpose of directing the aeroplane and keeping it in a normal attitude. Another type of aerofoil under the definition is the propeller blade, the reaction of which creates the thrust.

In each of the above cases the resistance set up by the aerofoil to projection through the air is termed aerodynamic reaction, and also in each case cited the reaction is divided into two components, the larger of the two termed "lift" or "Y", and the smaller termed drag. All the exposed parts of an aeroplane create drag and interference, but unlike the aerofoils, the other parts of an aeroplane of conventional pattern do not create the useful or "Y" component of resistance, these non-aerofoil parts, such as struts, wires, chassis and the usual type of radiator, consume the power of the motor without any useful aerodynamic reaction and therefore the type of resistance they create has been called "parasite" or structural resistance.

A further object of the invention is to provide a construction and arrangement, in harmony with the primary object, which affords the pilot an unobstructed view in virtually all directions and wherein the aeroplane controls are conveniently located within a protected or wholly inclosed pilot's cabin after the manner disclosed in my Patents Nos. 1,644,787 and 1,771,053.

A further object of the invention is the transverse disposition of the weight of motors and useful load within double convex wing and body forms and adjacent air and ground support so as to avoid extreme cantilever stresses in the wing structure and to reduce as much as practicable the wing thickness forward of the rear controls.

A further object is to close flush with the external aeroplane surface the slots into which the wing bracing is housed when retracted.

A further object of the invention is the provision wherein chassis and all external bracing may be retracted and housed within an aerofoil and fuselage and wherein these are well streamlined and rendered water tight.

With the above and other ends in view the invention consists in the matters hereinafter set forth and more particularly pointed out in the appended claims, reference being had to the accompanying drawings, in which, Fig. 1 is a plan view of a structure illustrative of the invention.

Fig. 2 is a front elevation of the same in the attitude for high speed.

Fig. 3 is a side elevation of the same also in the attitude of low incidence and high speed and indicating the attitude for landing by the ground line x—x.

Fig. 4 is an enlarged view of the forward end of one of the fuselage fins and adjacent wing and showing the raised rear horizontal control.

Fig. 5 is an enlarged sectional view of the rear end of a fuselage showing the internal operation of the vertical rudder.

Fig. 6 is an enlarged view of the retractable chassis showing details of the retracting wing braces.

Fig. 7 is an enlarged sectional view of the rear vertical rudder.

Fig. 8 is a sectional view of the wing showing the disposition of useful load as indicated by numerals 10 in Fig. 1.

Fig. 9 shows in section the wing bracing housed in the under surface of the wing or the side of the fuselage.

Fig. 10 shows the valves which permit the coupling of sections of the surface type radiator while Fig. 11 shows such a section.

Fig. 12 is an enlarged side elevation of the empennage.

Referring now to the detailed construction which is illustrative of one form of the invention, 1 is the main wing or sustaining aerofoil of a form and proportion capable of housing passengers and freight, lowering the drag in spite of additional thickness and lessening the interference on the rear controls. 2 is the fin shaped type of fuselage having a sharp leading edge in place of the usual nose radiator and a bottom rounded in a plane transverse to the flight path and the said rounded bottom portion of the said fuselage adapted as a boat and spaced apart from the wing 1 to keep the wing well clear of the water; 3 is the rear horizontal control aerofoil placed well above the top of the wing level and having a rigid portion forward and a movable flap 3ª aft, with the surface of greatest lift downward. 4 is the rear vertical rudder neatly journaled in the rear of the fuselage 2, and operated as shown in Fig. 5 by control cables 4ᵇ which lead from forward pilot's cabin around pulleys 4ᶜ to the tiller 4ª which operates the rudder to positions indicated by dotted lines. 5 indicates a motor which can be located either in the forward part of the fin type fuselages or in the wings as more fully disclosed in my Patent No. 1,603,134 issued Oct. 12, 1926, and 6 shows the propeller shaft which can protrude from either fuselage or wings. 7 is the metal propeller while 8 is the retractable chassis pivoted within the body skin at 8' and braced by the arc 8ª: 9 indicates the pilot's window or port from which he can see in practically all directions: 10 indicates the useful load disposed transversely through the wing about its maximum camber and the detail of which is disclosed in Fig. 8, where 22 is the outer cover of the metal wing, 19 an angle iron support therefor, 20 and 21 are built up wing spars of the main wing 1 and as indicated in the parent Patent No. 1,771,053 the wing structure is built integral with and continues across the bodies 2. These bodies extend a distance below the lower side of the wing, they being built into and forming part of the wing and being spaced apart with the wing continuing across the space as shown in Figs. 1 and 2; these bodies are quite short as contrasted with usual practice and at their rear ends are connected by a stability aerofoil having a movable rear part: This aerofoil performs the usual function of lending longitudinal stability to the aeroplane, but can be made smaller and brought nearer to the main wing because of its relatively elevated position above the flight path of the said wing for the high speed attitude of the aeroplane and because the double convex type of wing creates less wake disturbances in the air and also because my device of distributing the loads laterally within the wing in contrast to present practice of concentrating the loads near the wing's center permits direct support in place of "bridged support" for the loads both in the air and through the laterally spaced apart chassis and unlike any aeroplane heretofore known leaves the most efficient portion of the wing, i. e. its center, free of wing-body interference. 11 indicates the ailerons which are trailing-edge, but may be of an improved form as shown in my Patent No. 1,627,191, issued May 3rd, 1927.

It is understood that the form of internal trussing disclosed in Figure 8, is used for the internal strengthening of the other aerofoils, such as 2, 3 and 4.

12 is the wing brace which makes a truss through the extended chassis to support the wing and retracts with the chassis as more clearly shown in enlarged views Figs. 4—6 and 7; 13 is the hinge joint where the brace folds inward when the chassis retracts, the joint being actuated by the wire 14. It will be apparent that the end of the brace is fitted to a universal 16 which permits it to turn while folding back, so that lower part of brace 15 folds snugly against chassis frame and into a groove of same, so as to bring its outer wall 24 flush with the external skin of the fuselage as indicated in Fig. 9. 17 in Fig. 4 indicates the position of short part 15 of brace 12, and 18 the position of brace 12 when retracted into lower surface of wing; the upper end of brace 12 is fitted with a universal such as 16, and Fig. 9 is typical of either the short brace section in the side of fuselage or of the longer part of 12 when retracted into the wing; in both cases the surface form of radiator can easily be employed as shown, using a bypass 25 for the water circulation, and the corrugations of the radiator surface preferably run fore and aft as shown at 23 of Fig. 11; Fig. 9 shows the corrugations as they would appear in section in relation to a wing or chassis brace running fore and aft, such as those shown in my Patent No. 1,627,191. 26 shows a section attachment while 27, 28 and 29 show valves and section connections such as those necessary for enlarging or reducing the radiator area by adding or removing radiator sections from aeroplane surface. 4ᵈ shows the streamlined ground skid with resilient mounting inside the rudder, where 4ᵉ indicates the braces from rudder post holding the rubber bands 4ᶠ and forming part of the internal bracing of the rudder: 2ª represents the section angle brace of the rear part of fuselage 2, while 2ᵇ indicates the rudder post groove. 3ª, the movable part of horizontal control aerofoil 3, is operated entirely from within the fuselage 2 by push and pull rod 3ᵇ and bent arm 3ᶜ. After retraction of wheels and chassis frame 8 a sliding door covers the aperture in the lower surface of fuselage 2 after the fashion disclosed in my issued Patent No. 1,418,008 and my Patent No. 1,627,191.

In addition to the advantages already pointed out my double convex type of aerofoil provides unusual load space between its fore and aft spars and when combined with bodies such as those illustrated by 2 and the efficient rear control 3 has its lowest drag nearer the high speed flying attitude of the aeroplane than the wings of concave under side and therefore requires less movement of the rear control to alter the attack angle of the aeroplane through its entire flight range. The attitude of the plane for alighting is shown by the line X—X drawn under the rear skid and tangent to the wheel of the retractable chassis 8.

Thus it will be seen that I have disclosed a most unique type of wing, body, motor, chassis and rear control arrangement, not even nature affording a similar flying type for, all winged creatures have their centers burdened by a considerable body and weight.

Wide departures can be made from the specific embodiment of my invention herein illustrated without losing the benefits thereof and I do not limit myself to the precise disclosure.

What I claim is:—

1. In an aeroplane provided with two fuselages having boat shaped bottoms, alighting gear under each fuselage and means to retract the said gear within the streamline thereof.

2. In an aeroplane provided with two fin shaped bodies spaced apart along the span of a single internally trussed wing, two separate chassis, one under each of the said bodies and means to retract the said chassis within the streamline of the said bodies during flight.

3. An aeroplane provided with two streamlined, spaced apart, boat shaped bodies adapted to float on the water and supporting a wing devoid of external bracing in flight and having load carrying compartments distributed along its span and an alighting wheel retractable within each of the said bodies.

4. An aeroplane provided with two streamlined spaced apart boat shaped flotation bodies for the support of the aeroplane on the water, a supporting wing devoid of external bracing in flight, said wing having forward and rear spars and load carrying compartments distributed along its span, between the said spars and on both sides of each of the said bodies; a horizontal stabilizer aerofoil held rigidly in spaced apart relation rearwardly from the central portion of the said wing and located in a plane above the path of the top of the said wing for the high speed attitude of the said aeroplane, the said wing having a substantially uniform chord throughout the compartment span area thereof.

5. An aeroplane provided with two streamlined, spaced apart bodies, a supporting wing devoid of external bracing in flight and having load carrying compartments distributed along the greater portion of its span and housed therewithin, the said bodies in flight supported by and immediately contacting the said wing, a motor mounted in the forward part of each said body and an alighting wheel retractable within each of the said bodies, whereby each of the said motors, although spaced apart from the wing center, is adjacently supported by one of the said wheels.

6. An aeroplane provided with two streamlined, spaced apart bodies having a propeller and propeller shaft mounted at their forward ends, said bodies carried by a wing devoid of external bracing in flight, extending between and on both sides of the said bodies and inclosing load carrying compartments distributed along substantially the extent of its span in the region of the wing's greatest thickness, an aeroplane motor in each of said bodies to drive the respective propeller shaft thereof and an alighting wheel retractable within each of the said bodies, whereby the said aeroplane will have laterally distributed support for the said motors and for the said compartments for both ground alighting and flight conditions.

7. An aeroplane provided with two streamlined shaped bodies spaced apart along the span of a single internally trussed wing, with the greater part of both said bodies located below the said wing, the said wing between the said bodies being substantially straight transversely to flight, thick enough to inclose its adequate trussing therewithin for both flight and alighting conditions and devoid of external trussing in flight, a horizontal control aerofoil located directly to rearward of and above the plane of the top of the said wing central portion, a streamlined cantilever structure supporting said control aerofoil from the said wing central portion; two separate alighting devices spaced widely apart laterally from each other and from the wing center and means to retract the said alighting devices within the streamline of the said aeroplane during flight.

8. In an aeroplane provided with two streamlined shaped bodies spaced apart from the wing's center along the span of a single internally trussed wing and connected thereto, the said wing central portion between the said bodies being substantially straight transversely to flight, thick enough to inclose its adequate trussing for both flight and alighting conditions and devoid of external bracing in flight, an aeroplane propelling unit located in each of the said bodies, a horizontal stabilizer control aerofoil held by streamlined cantilever structure in spaced apart relation to rearward of and above the plane of the top of the said wing central portion and of the plane of the central portion of the said propelling units for the aeroplane's attitude at high speed, two separate alighting devices spaced widely apart laterally from the wing center and means to retract the said alighting devices within the streamline of the under portion of the said aeroplane in flight, whereby distributed support is had for distributed loads for both flight and alighting conditions and wind resistance and interference on the said wing and on the said rear control aerofoil are greatly reduced.

JAMES V. MARTIN.